United States Patent
Gueller

(10) Patent No.: US 10,894,000 B2
(45) Date of Patent: Jan. 19, 2021

(54) METHOD AND DEVICE FOR PRODUCING AN EXTRUDATE

(71) Applicant: Chemspeed Technologies AG, Fullinsdorf (CH)

(72) Inventor: Rolf Gueller, Herznach (CH)

(73) Assignee: Chemspeed Technologies AG, Fullinsdorf (CH)

( * ) Notice: Subject to any disclaimer, the term of this patent is extended or adjusted under 35 U.S.C. 154(b) by 658 days.

(21) Appl. No.: 15/510,279

(22) PCT Filed: Sep. 8, 2015

(86) PCT No.: PCT/CH2015/000130
§ 371 (c)(1),
(2) Date: Mar. 10, 2017

(87) PCT Pub. No.: WO2016/037294
PCT Pub. Date: Mar. 17, 2016

(65) Prior Publication Data
US 2017/0258684 A1     Sep. 14, 2017

(30) Foreign Application Priority Data

Sep. 12, 2014 (CH) .................................... 1386/14

(51) Int. Cl.
*B29C 48/30* (2019.01)
*B29C 48/475* (2019.01)
(Continued)

(52) U.S. Cl.
CPC . *A61J 3/08* (2013.01); *A61J 3/00* (2013.01); *B29B 7/38* (2013.01); *B29C 48/02* (2019.02);
(Continued)

(58) Field of Classification Search
CPC ........ A61J 3/00; A61J 3/06; A61J 3/08; A61J 3/10; B29B 7/38; B29C 48/02;
(Continued)

(56) References Cited

U.S. PATENT DOCUMENTS 1,318,928 A * 10/1919 Shields .................. B05C 17/01
222/327
2,904,830 A * 9/1959 Mulrooney, Jr. ..... B29C 45/586
425/376.1
(Continued)

FOREIGN PATENT DOCUMENTS

DE     102004032051 A1     1/2006
WO         0032169 A2     6/2000

OTHER PUBLICATIONS

Kolter et al.; "Hot-Melt Extrusion with BASF Pharma Polymers"; Extrusion Compendium: 2nd Revised and Enlarged Edition; 2012; pp. 1-201.

*Primary Examiner* — Xiao S Zhao
*Assistant Examiner* — Joseph S Leyson
(74) *Attorney, Agent, or Firm* — The Webb Law Firm

(57) ABSTRACT

In a method and a corresponding device for producing an extrudate, starting products are introduced into an extrusion container, heated, and homogeneously intermixed by dual asymmetric centrifugation of the extrusion container. The extrusion container is rotated about a primary rotation axis that extends outside the extrusion container, and is simultaneously rotated about a secondary rotation axis that extends through the extrusion container and is situated at an acute angle with respect to the primary rotation axis. Lastly, the intermixed starting products are jointly extruded from the extrusion container. The method and the corresponding device are particularly suitable for processing small and very small substance quantities.

13 Claims, 6 Drawing Sheets

(51) Int. Cl.
  *B29C 48/86* (2019.01)
  *D01D 5/18* (2006.01)
  *D01D 1/02* (2006.01)
  *A61J 3/00* (2006.01)
  *A61J 3/08* (2006.01)
  *B29C 48/02* (2019.01)
  *B29B 7/38* (2006.01)
  *A61J 3/10* (2006.01)
  *A61J 3/06* (2006.01)

(52) U.S. Cl.
  CPC .......... *B29C 48/301* (2019.02); *B29C 48/475* (2019.02); *B29C 48/865* (2019.02); *D01D 1/02* (2013.01); *D01D 5/18* (2013.01); *A61J 3/06* (2013.01); *A61J 3/10* (2013.01); *A61J 2200/20* (2013.01)

(58) Field of Classification Search
  CPC ..... B29C 48/301; B29C 48/36; B29C 48/475; B29C 48/802; B29C 48/865; D01D 1/02; D01D 1/04; D01D 5/18
  See application file for complete search history.

(56) References Cited

U.S. PATENT DOCUMENTS

| | | | |
|---|---|---|---|
| 5,965,161 A | 10/1999 | Oshlack et al. | |
| 2004/0216839 A1* | 11/2004 | Yamamoto | H01L 21/563 156/322 |
| 2006/0002859 A1 | 1/2006 | Arkenau et al. | |
| 2008/0211121 A1* | 9/2008 | Lai | D01D 5/0069 264/8 |
| 2009/0281663 A1* | 11/2009 | Robida | B01F 9/0001 700/265 |

* cited by examiner

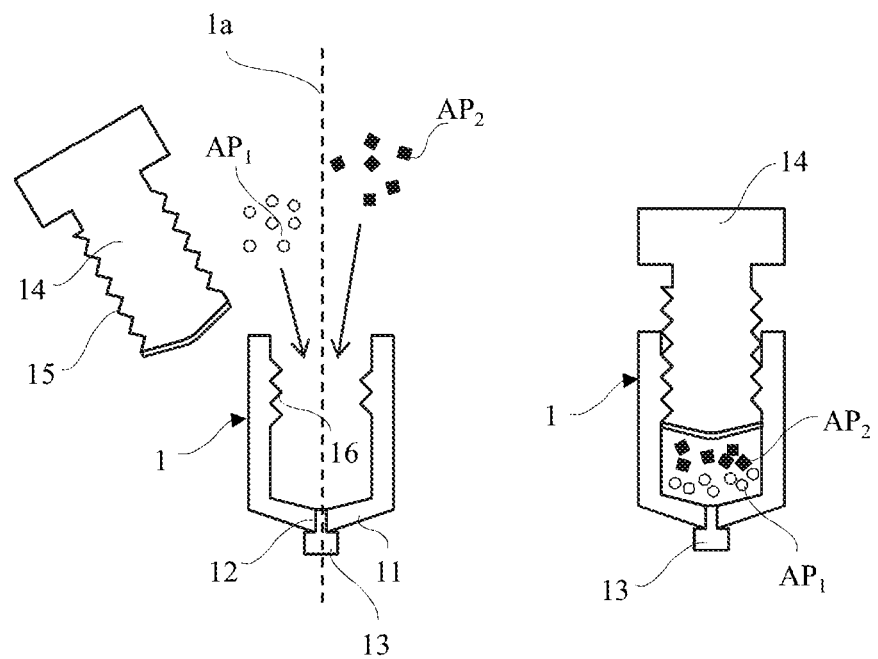
Fig. 1  Fig. 2
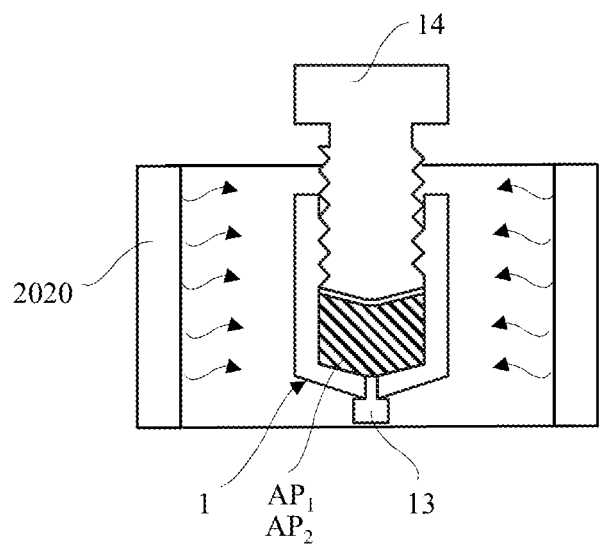
Fig. 3

METHOD AND DEVICE FOR PRODUCING AN EXTRUDATE

CROSS-REFERENCE TO RELATED APPLICATIONS

This application is the United States national phase of International Application No. PCT/CH2015/000130 filed Sep. 8, 2015, and claims priority to Switzerland Patent Application No. 01386/14 filed Sep. 12, 2014, the disclosures of which are hereby incorporated in their entirety by reference.

BACKGROUND OF THE INVENTION

Field of the Invention

The present invention relates to a method and a device for producing an extrudate.

Description of Related Art

In the pharmaceutical industry, work is continually ongoing in the improvement of application methods for (potential) medicines. One such method is the so-called hot melt extrusion process, in which a medicine is homogeneously mixed or melted into a specific (for example, water-soluble) polymer (having, for example, the additional action as an emulsifier). Checking the effectiveness (of the speed of delivery of the active substance, for example) is usually carried out by producing various polymers and medicines and possibly additives such as emulsifiers under various conditions. Continuously operating hot melt extruders are typically used for this purpose. In operation, the polymer and the appropriate concentration of the potential medicine and any further additives are added to a temperature-regulated extruder, in particular a screw extruder or a twin-screw extruder, and then homogeneously admixed in the extruder, near or above the melting point of the polymer. Extrusion is subsequently carried out, and the extrudate (or cut pieces of an extruded strand) is tested, for example, for how quickly the extrudate, and thus also the previously incorporated medicine, dissolves. This procedure and the associated technologies are described in detail in "Hot Melt Extrusion with BASF Pharma Polymers Extrusion Compendium", 2nd revised and supplemented edition, October 2012, by K. Kolter, M. Karl, and A. Grycke.

To be able to investigate preferably a large number of polymers/medicines/additive mixtures of different formulations, process parameters, and concentrations in combination with various tests, a very large number of such trials and subsequent tests is often necessary. This takes a great deal of time, in particular since the extrusion methods and devices used heretofore for this purpose on the laboratory scale operate continuously, and therefore require a considerable amount of preparation time. On the other hand, with recent research methods there is increasingly less availability of the substance to be tested. However, the known continuously operating methods and devices require a relatively large quantity of test substances. This is undesirable in particular for time to market and cost reasons.

On this basis, an object of the invention is to provide a method for producing an extrudate, and a corresponding device, which operate very quickly and efficiently and also allow the processing of very small substance quantities.

A further aim is for the method to preferably meet the requirements for automatic handling. In addition, the method should preferably be scalable, so that the method (and the corresponding device) may be used not only in research and development, but also in production. At the same time, it is the aim for the method and the corresponding device to be usable not only for melting in of pharmaceutical active substances, but also, for example, for fixing flavoring agents in polymers so that they may be subsequently released under controlled conditions. Furthermore, the method and the corresponding device should also be generally suitable for producing extrudates from polymer mixtures.

SUMMARY OF THE INVENTION

With regard to the method according to the invention, the essence of the invention is as follows: In a method for producing an extrudate, at least two starting products, at least one of which is a hot-melting starting product, are introduced into an extrusion container, heated, and homogeneously intermixed. For mixing the starting products, the extrusion container containing the starting products is dual asymmetrically centrifuged, the extrusion container being rotated about a primary rotation axis that extends outside the extrusion container, and being simultaneously rotated about a secondary rotation axis that extends through the extrusion container and is situated at an acute angle with respect to the primary rotation axis. Lastly, the intermixed starting products are jointly extruded from the extrusion container.

In the method according to the invention, the intermixing of the starting products does not take place primarily in the classical manner by mechanical movement of the starting products within the extrusion container, but, rather, takes place based on diffusion, i.e., by accelerated diffusion of the starting products, which are generally difficult to mix, into one another. The diffusion of the generally highly viscous, hot substance mixture is achieved by the combination of the acceleration forces which act in two different planes during the dual asymmetric centrifugation. Due to the use according to the invention of the principle of dual asymmetric centrifugation, the manufacture of products in the hot melt extrusion process is intensified and significantly speeded up, and the actual mixing operation takes very little time (typically about 1 minute or less). Another significant advantage of this method is that no mechanical elements are necessary in the extrusion container for intermixing the starting products, so that the extrusion container may be cleaned very easily, or may even be designed as a disposable container. A further significant advantage of the method according to the invention is that even very small substance quantities may thus be processed.

The starting products are normally present in flowable or pourable form, in particular in powdered form.

A preferably essentially cup-shaped container equipped with a lockable extrusion opening is advantageously used as the extrusion container, the extrusion opening being kept closed during the dual asymmetric centrifugation, and being opened prior to the extrusion. Such a closable and openable extrusion opening allows easy dual asymmetric centrifugation and subsequent extrusion.

The extrusion of the intermixed starting products present in the extrusion container preferably takes place by means of a piston, in particular a screw piston or threaded piston, that is movably situated in the extrusion container. Such a piston has a relatively small contact surface with the intermixed starting products, which facilitates cleaning.

According to another advantageous embodiment variant of the invention, the extrusion of the intermixed starting products present in the extrusion container takes place by single-axis centrifugation of the extrusion container. The mixing of the starting products present in the extrusion container is preferably carried out in a device which is dual asymmetrically centrifuged about two rotation axes, and the extrusion of the starting products present in the extrusion container is carried out after the mixing, in the same device, the device being centrifuged about only one of the two rotation axes during the extrusion. This method variant is advantageous in particular with regard to equipment, and facilitates handling.

With regard to the device, the essence of the invention is as follows:

A device according to the invention for producing an extrudate from at least two starting products, at least one of which is a hot-melting starting product, comprises an extrusion container for receiving the starting products, having an extrusion opening, heating means for heating the starting products present in the extrusion container, extrusion means for extruding the starting products, present in the extrusion container, from the extrusion container, centrifugation means for dual asymmetric centrifugation of the extrusion container about a primary rotation axis and a secondary rotation axis, the primary rotation axis extending outside the extrusion container, and the secondary rotation axis extending through the extrusion container and being situated at an acute angle with respect to the primary rotation axis.

The device preferably has retaining means for removably holding and retaining the extrusion container, which allows the extrusion container to be easily removed and exchanged.

The device advantageously includes locking means for opening and closing the extrusion opening of the extrusion container. This allows easy dual asymmetric centrifugation and subsequent extrusion.

According to one advantageous embodiment of the device according to the invention, the extrusion means include a piston, movably situated in the extrusion container, for ejecting the intermixed starting products, present in the extrusion container, through the extrusion opening. The piston is advantageously designed as a screw piston or threaded piston that is advanceable by rotation in the extrusion container. In addition, the piston is advantageously removable from the extrusion container. Extrusion means and extrusion containers having this type of design have a simple construction, are suitable even for very small substance quantities, and may be easily cleaned.

The piston is advantageously provided with a preferably openable and closable vent opening.

The device advantageously includes drive means for moving the piston relative to the extrusion container.

According to another advantageous embodiment of the device according to the invention, the device is designed to be changeable between a first and a second operating mode, in the first operating mode the extrusion container rotating about both rotation axes, and in the second operating mode the extrusion container rotating about only one of the two rotation axes. The device is preferably designed for extruding the intermixed starting products, present in the extrusion container, from the extrusion container by single-axis centrifugation about the primary rotation axis, with the extrusion opening open. As a result of this design of the device, use of simple equipment for mixing the starting products and for extrusion of same from the extrusion container is achieved.

The device advantageously includes first drive means for rotatably driving the extrusion container about the primary rotation axis, and second drive means, which may be coupled to and decoupled from the first drive means, for rotatably driving the extrusion container about the secondary rotation axis.

The extrusion opening advantageously opens out from the extrusion container essentially radially relative to the primary rotation axis.

The device advantageously has collection means for extrudate exiting from the extrusion container.

The method according to the invention and the device according to the invention are described in greater detail below based on exemplary embodiments, with reference to the appended drawings. The figures show the following:

BRIEF DESCRIPTION OF THE DRAWINGS

FIGS. 1-6 show the individual steps of a first exemplary embodiment of the method according to the invention, using a first exemplary embodiment of the device according to the invention;

DESCRIPTION OF THE INVENTION

Figure 4:
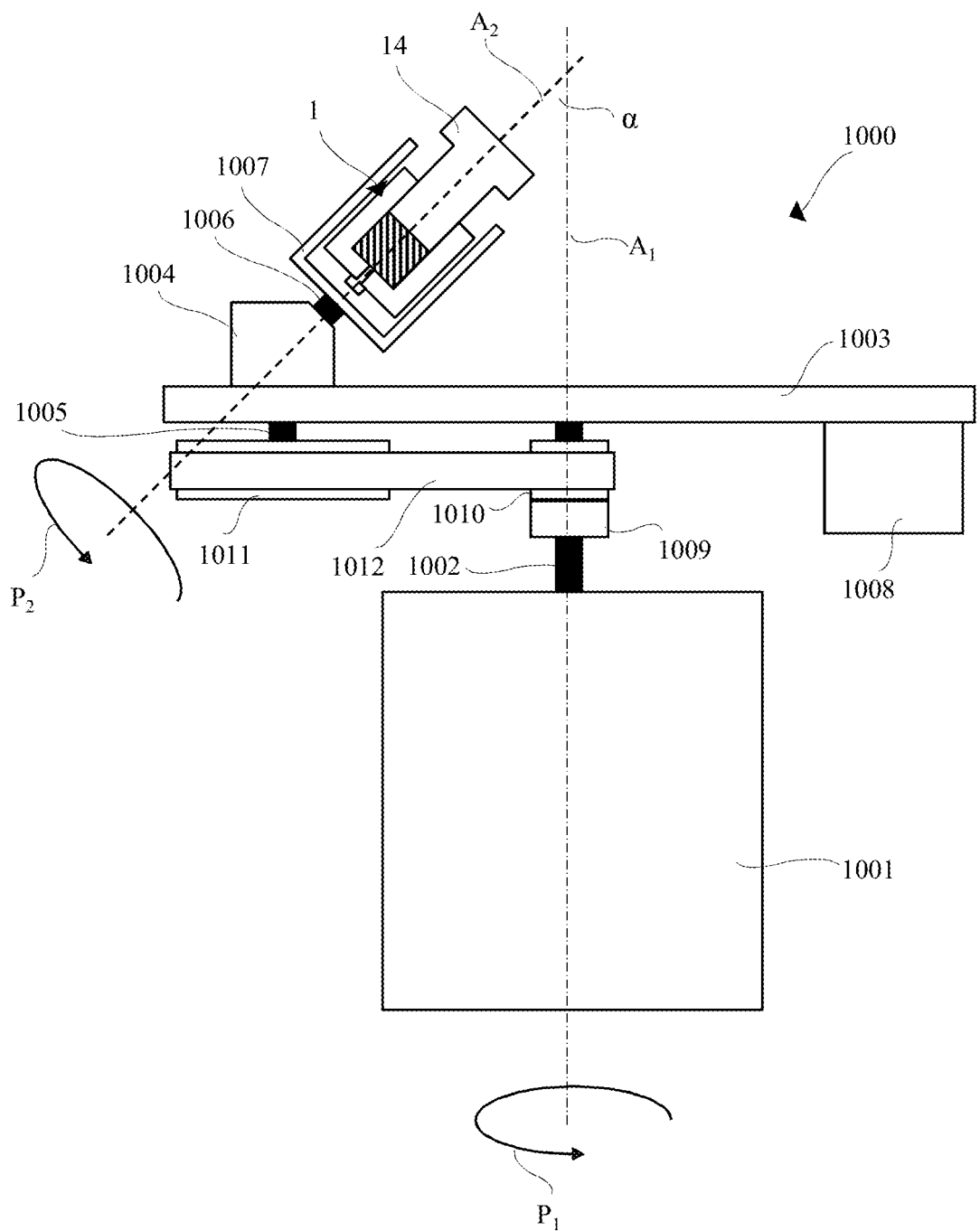

The following applies for the description below: If reference numerals are indicated in a figure for the purpose of clarity of the illustrations, but are not mentioned in the directly associated portion of the description, reference is made to their explanation in the preceding or subsequent portions of the description. Conversely, to avoid excessive detail in the illustrations, reference numerals that are less relevant for direct understanding are not provided in all figures. In this regard, reference is made to the respective other figures.

The basic steps of the extrusion method according to the invention are illustrated in FIGS. 1 through 3 by way of example.

According to FIG. 1, in a preparatory step an essentially rotationally symmetrical, cup-shaped extrusion container 1 is provided, with its open end at the top. An axis of the extrusion container is denoted by reference numeral 1$a$. The extrusion container 1 contains in its base 11 at the bottom of container 1 an extrusion opening 12, which initially is closed via a locking means in the form of a screwable and unscrewable screw pin 13. The capacity of the extrusion container 1 is only a few cm$^3$, for example, but of course may also be larger.

Appropriate quantities of the starting products to be processed, present in flowable or pourable form, are now introduced into the extrusion container 1. FIG. 1 symbolically illustrates only two starting products $AP_1$ and $AP_2$, although, depending on the extrudate to be produced, of course more than two starting products may be necessary. At least one of the starting products is hot-melting, and in particular is a hot melting polymer. "Flowable or pourable", here and in the discussion below, is understood to mean powdered, grainy (granular), low-viscosity, viscous, and high-viscosity. Powdered or granular starting products are generally used in the method according to the invention. Typically, at least one of the starting products is a hot melting polymer, and another starting product is a pharmaceutical active substance to be tested or a formulation of same. In addition, even further starting products, for example emulsifiers or other additives, may be used.

After filling with the starting products, the extrusion container 1 is closed by means of a screw piston 14 that is screwable into the open end of the extrusion container 1 (FIG. 2).

In the process, an external thread 15 of the screw piston 14 engages with an internal thread 16 in the extrusion container 1.

In the next step, the starting products $AP_1$ and $AP_2$ present in the extrusion container 1 are heated and brought to a temperature near or above the melting point of the hot-melting starting product. For this purpose, the extrusion container 1 is introduced into a heating jacket 2020, for example (FIG. 3). Any other heating means may be used instead of the heating jacket 2020.

The extrusion container 1 is subsequently inserted into a centrifugation device, illustrated in FIG. 4. The centrifugation device, denoted overall by reference numeral 1000, includes a rotary table 1003 that is rotatably drivable by a motor 1001 by means of a shaft 1002. A deflection gear 1004 which includes a drive shaft 1005 and an output shaft 1006 is situated on the rotary table 1003. A retaining means in the form of a cup-like frame 1007, in which the extrusion container 1 is removably held, rests on and is connected to the output shaft 1006 in a rotatably fixed manner. An imbalance compensation weight 1008 is situated beneath the rotary table 1003, diametrically opposite from the deflection gear 1004. The shaft 1002, which is driven by the motor 1001, passes through a coupling part 1009 that is stationary with regard to rotation, and through a belt pulley 1010 that is freely rotatable on the shaft 1002. A further belt pulley 1011 rests on and is connected to the drive shaft 1005 of the deflection gear 1004 in a rotatably fixed manner. The two belt pulleys 1010 and 1011 are coupled to one another via a drive belt 1012 upon rotation. The rotational axes of the shaft 1002 and of the rotary table 1003, and of the output shaft 1006 of the deflection gear 1004, form a primary rotation axis $A_1$ and a secondary rotation axis $A_2$, respectively.

The secondary rotation axis $A_2$ passes through the extrusion container 1, and preferably coincides with the axis $1a$ of the extrusion container (FIG. 1). The secondary rotation axis $A_2$ is spatially configured in such a way that it encloses an acute angle α of between 10° and 80°, preferably between 20° and 70°, more preferably between 30° and 60°, typically approximately 40°, with the primary rotation axis $A_1$.

The motor 1001, the shaft 1002, and the rotary table 1003 form first drive means for rotatably driving the extrusion container 1 about the primary axis $A_1$. The rotating or revolving movement of the extrusion container is symbolized by an arrow $P_1$. The deflection gear 1004, the output shaft 1006, the drive shaft 1005, the belt pulley 1011, the drive belt 1012, and the belt pulley 1010 form second drive means, which may be coupled to and decoupled from the first drive means, for rotatably driving the extrusion container 1 about the secondary axis $A_2$ or about itself, this rotary movement being indicated by the arrow $P_2$.

As explained in greater detail below, the centrifugation device 1000 has a design that is changeable between a first and a second operating mode.

In the operating mode of the centrifugation device illustrated in FIG. 4, the stationary coupling part 1009 is connected to the belt pulley 1010 in such a way that this belt pulley cannot rotate. When the rotary table 1003 rotates about the primary axis $A_1$, the deflection gear 1004 moves on a circular path about the stationary belt pulley 1010, thereby driving the belt pulley 1011. The rotary movement of the belt pulley 1011 is transferred via the deflection gear 1004 to the extrusion container holding frame 1007, and thus to the extrusion container 1. In this operating mode of the centrifugation device, the extrusion container 1 thus rotates simultaneously about two axes, namely, the primary rotation axis $A_1$ and the secondary rotation axis $A_2$ (i.e., about itself). The corresponding rotary movements are symbolized by arrows $P_1$ and $P_2$. In this operating mode, the centrifugation device represents a dual asymmetrically operating centrifuge.

The extrusion container 1 is now dual asymmetrically centrifuged by means of the centrifugation device 1000 over a certain time period. In the process, the starting products present in the extrusion container are homogeneously intermixed very intensively in a very short time.

The rotational speeds about the two rotation axes $A_1$ and $A_2$ are empirically set in such a way that on the one hand, preferably high centrifugal accelerations and brief mixing times (centrifugation durations) are achieved, but on the other hand, the materials being mixed (the starting products) are not thermally damaged. Centrifugal acceleration values of 30 to 5000 m/s$^2$, preferably 2500 to 3500 m/s$^2$, are values that are suitable in practice. Mixing times of approximately 1 minute or even less may thus be achieved.

Of course, it is also possible for the heating of the starting products present in the extrusion container 1 to not take place until in the centrifugation device 1000, or during the dual asymmetric centrifugation. For this purpose, the centrifugation device 1000 would then have to be equipped with appropriate heating means situated, for example, on or in the cup-like frame 1007. In principle, it is also possible to equip the extrusion container 1 itself with heating means.

In addition, it is also possible to mix the flowable or pourable starting products together in the extrusion container 1 in two steps by dual asymmetric centrifugation, a first mixing step taking place before the starting products are heated, and a second mixing step taking place after the starting products are heated.

Figure 5:
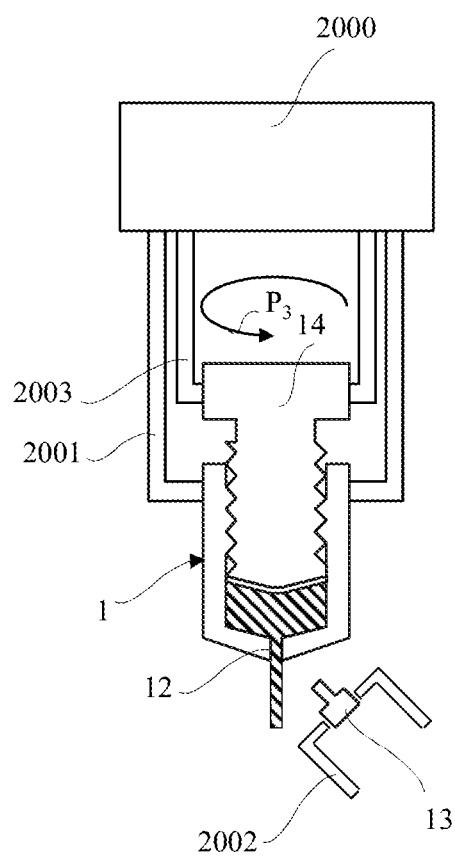

After the starting products are mixed by the aforementioned dual asymmetric centrifugation, the extrusion container 1 is removed from the centrifugation device 1000. This may preferably take place by means of a gripper 2001 of a computer-controlled handling device 2000 (FIG. 5). An additional gripper 2002 of the handling device 2000 screws the screw pin 13 out of the base 11 of the extrusion container 1, thus opening the extrusion opening 12.

Figure 6:
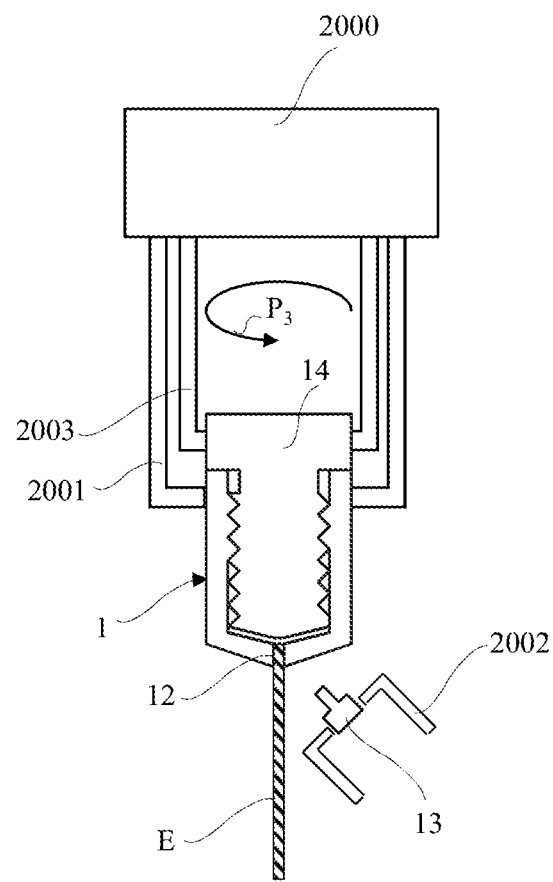

The actual extrusion operation now takes place. For this purpose, preferably using a further gripper 2003 of the handling device 2000, the screw piston 14 is screwed into the extrusion container 1 (arrow $P_3$), as the result of which the homogeneously intermixed starting products present in the extrusion container are extruded from the extrusion container 1 through the extrusion opening 12 (FIG. 6). The resulting extrudate E, which typically solidifies at a low ambient temperature, is suitably collected and then supplied for analysis or some other use. It is understood that the extrusion opening 12 of the extrusion container 1 may be suitably shaped to impart a desired cross-sectional shape to the extrudate.

FIGS. 7 through 10 illustrate different variants of extrusion containers, with starting products, not provided with reference numerals, in each case contained therein.

Figure 7:
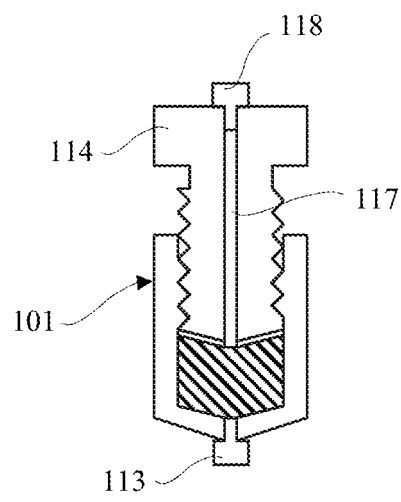
FIGS. 7-10 show four detail variants of the device according to the invention.

For the extrusion container 101 in FIG. 7, the screw piston 114 is provided with an axial vent channel 117 which is closed with a removable screw pin 118. The extrusion opening is closed via a locking means in the form of a screwable and unscrewable screw pin 113.

Figure 8:
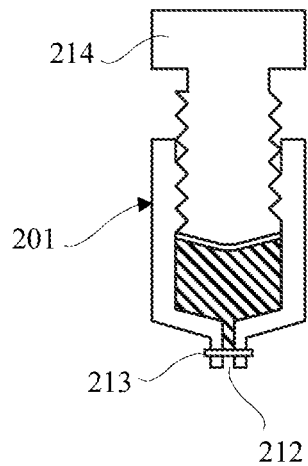

For the extrusion container 201 in FIG. 8, the locking means for the extrusion opening 212 is designed as an openable and closable valve 213. The screw piston is denoted by reference numeral 214.

Figure 9:
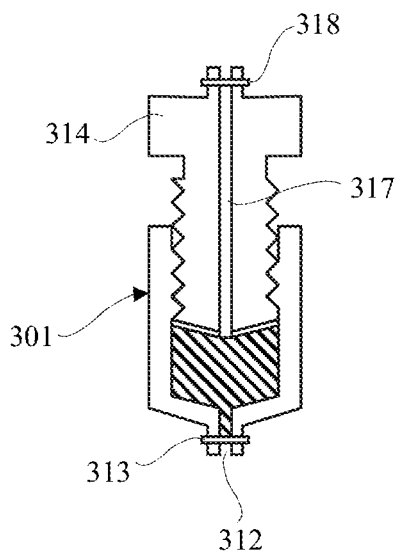

For the extrusion container 301 in FIG. 9, the locking means for the extrusion opening 312 as well as the locking means for the vent channel 317 in the screw piston 314 are designed as valves 313 and 318, respectively.

Figure 10:
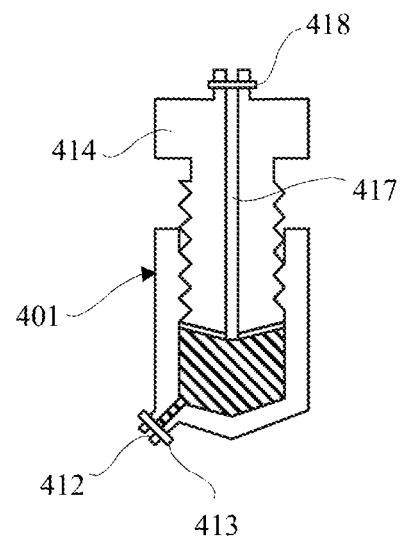

The extrusion container 401 in FIG. 10 has a design specifically for use in the exemplary embodiments of the method according to the invention explained below. The extrusion container has an extrusion opening 412 at the bottom of container 1 which opens out laterally and downwardly at an angle, and which is provided with an openable and closable valve 413. In addition, the screw piston 414 has a vent channel 417 with a valve 418.

The extrusion containers 1, 101, 201, 301, and 401 illustrated in FIGS. 1 and 7 through 10 may also be equipped with a pressure relief means, such as a pressure relief valve.

According to one particularly advantageous embodiment variant of the method according to the invention, the actual extrusion operation takes place by single-axis centrifugation of the extrusion container with the extrusion opening open, as explained below in conjunction with FIGS. 11 and 12 and FIGS. 13 and 14.

The centrifugation device 1000, as mentioned above, is designed for changing between a first and a second operating mode.

Figure 11:
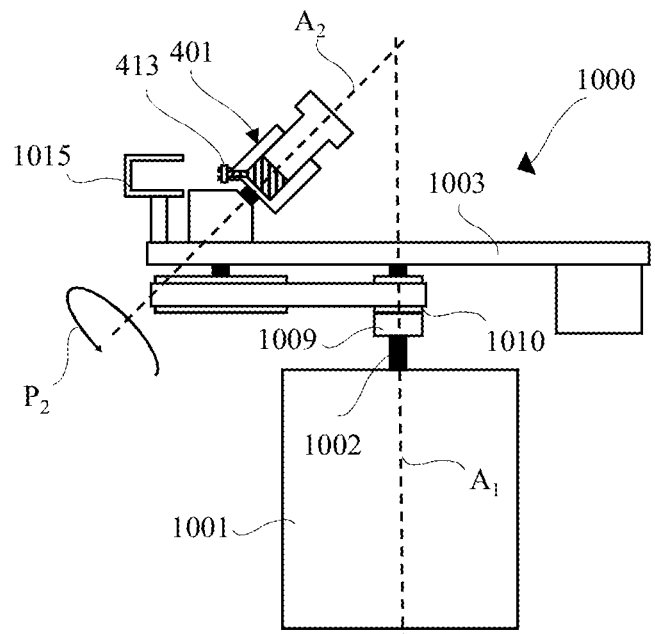
FIGS. 11-12 show two steps of a second exemplary embodiment of the method according to the invention, using a second exemplary embodiment of the device according to the invention.

FIG. 11 illustrates the centrifugation device 1000 once again, set in a first operating mode in which it operates as a dual asymmetric centrifuge. The extrusion container 401 from FIG. 10, having an extrusion opening that opens out radially with respect to the primary rotation axis $A_1$, is held in the frame 1007, not illustrated here; not all details of the extrusion container 401 are illustrated. The valve 413 is closed. In this operating mode of the centrifugation device, the mixing of the starting products takes place as described in conjunction with FIG. 4.

Figure 12:
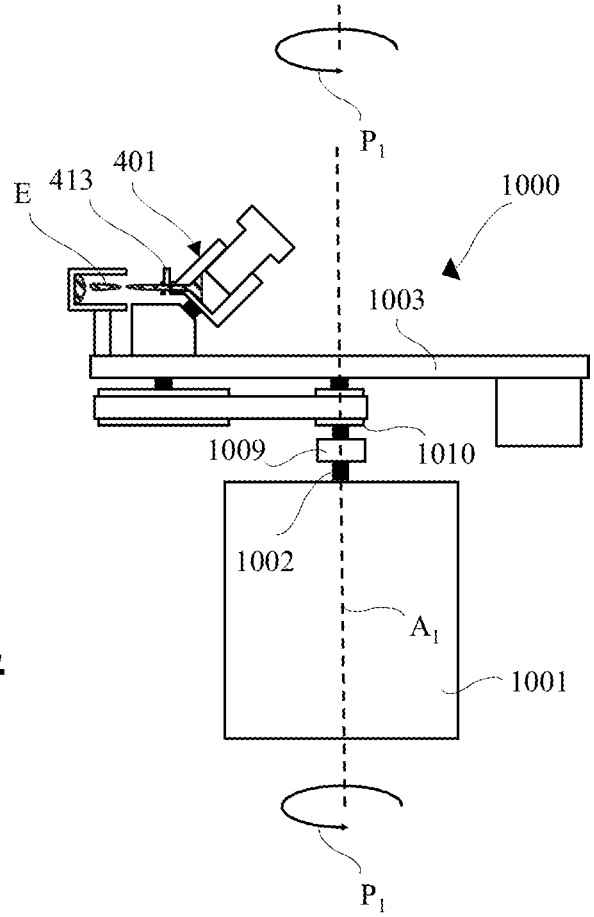

In the operating mode of the centrifugation device 1000 illustrated in FIG. 12, the stationary coupling part 1009 is decoupled from the belt pulley 1010, which is indicated in the drawing by a slightly axially displaced position of the coupling part 1009. The belt pulley 1010 may now rotate freely on the shaft 1002. The belt pulley 1010 now co-rotates with the revolving movement of the belt pulley 1011, and therefore is no longer able to rotatably drive the latter. In this operating mode of the centrifugation device, the extrusion container 401 thus no longer rotates about the secondary rotation axis $A_2$ or about itself, but, rather, rotates only about the primary rotation axis $A_1$, the rotary movement about this axis being symbolized by the arrow $P_1$. In this operating mode, the centrifugation device operates as a classical single-axis centrifuge.

The change between the two operating modes of the centrifugation device takes place with a very simple design via coupling and decoupling of the belt pulley 1010 and the coupling part 1009. The coupling may be achieved on an electromagnetic basis, for example.

For the actual extrusion, the valve 413 at the extrusion opening 412 and the valve 418 at the vent channel 417 (FIG. 10) are now opened. Due to the centrifugal forces that occur, the homogeneously intermixed starting products present in the extrusion container 401 are expelled from the extrusion container 401 through the extrusion opening 412, and thus extruded. The extrusion opening 412, as shown in FIG. 12, opens out radially with respect to the primary rotation axis $A_1$. The extrudate E is collected in a collection container 1015 that is situated on the rotary table 1003 and therefore stationary relative to the extrusion container 401 (FIG. 12).

Figure 13:
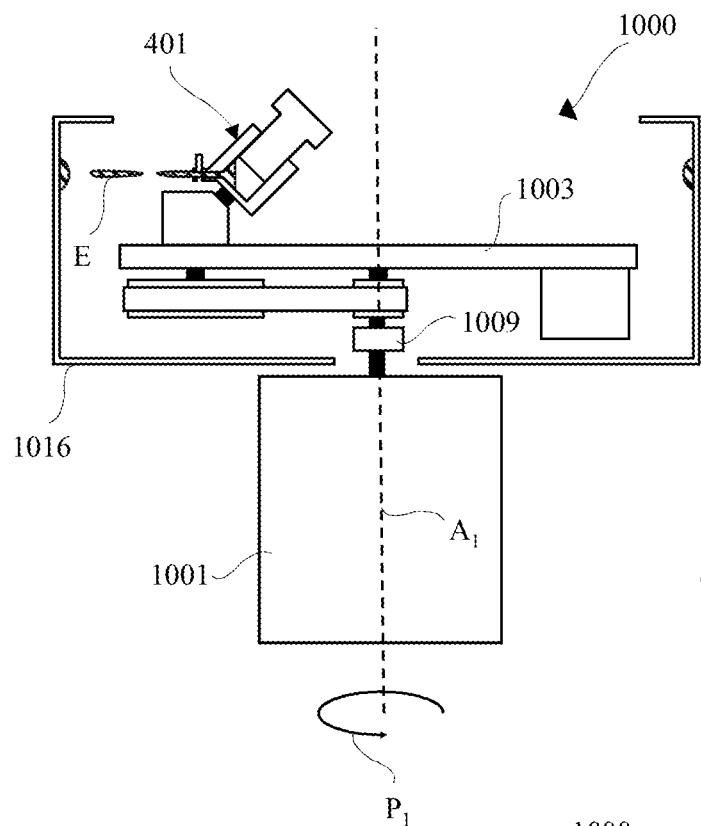
FIGS. 13-14 show two further exemplary embodiments of the device according to the invention.
Figure 14:
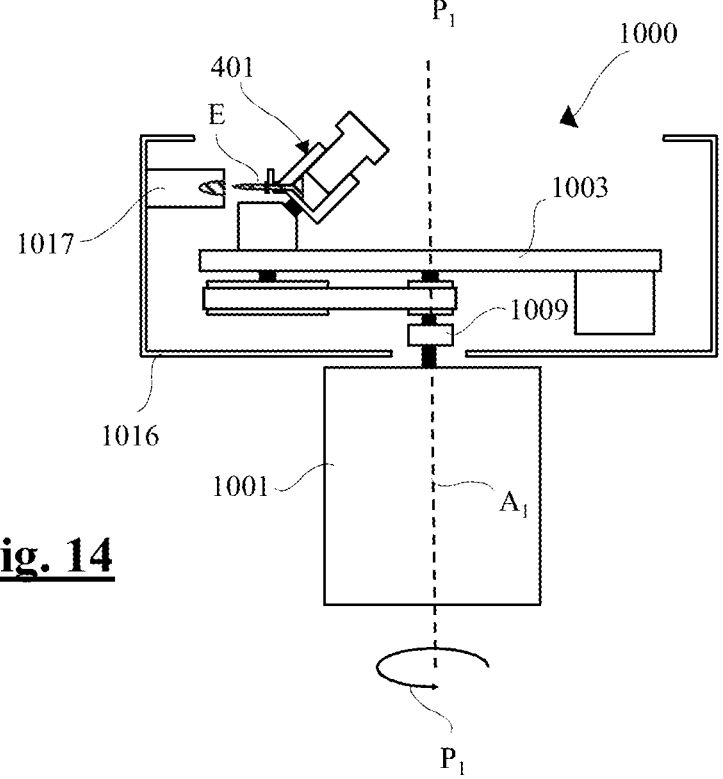

The additional two exemplary embodiments of the device according to the invention illustrated in FIGS. 13 and 14 differ from the exemplary embodiment according to FIGS. 11 and 12 only in how the extrudate E is collected. Instead of a collection container that is situated on the rotary plate 1003, in these exemplary embodiments a stationary trough 1016 which surrounds the rotary table 1003 and the components mounted on/at the rotary table is provided. In the exemplary embodiment in FIG. 14, in addition a cutting block 1017 which divides the extrudate strand E into small pieces is situated at the inner wall of the trough 1016.

A major advantage of the device according to the invention is that the mixing step, which takes place by dual asymmetric centrifugation, as well as the actual extrusion by classical centrifugation may be carried out in the same centrifugation device, so that on the one hand separate devices are not necessary for these two method steps, and on the other hand the handling is greatly simplified.

The method according to the invention and the device according to the invention are particularly suitable for producing extrudates in which a pharmaceutical active substance is melted into a polymer. However, they are also usable for producing extrudates in which flavoring agents, for example, are fixed in polymers. Furthermore, the method and the device are generally also suitable for producing extrudates from polymer mixtures. The method and the device are particularly suitable for small and very small substance quantities required primarily in research and development, but may be easily scaled to production ratios with larger substance quantities.

In another variant, multiple extrusion containers may be combined into an extrusion container block and dual asymmetrically centrifuged together. The actual extrusion operation may likewise take place at the same time for all extrusion containers. In this way, multiple extrudates, for example with different starting products or different quantity ratios thereof, may be produced in one pass.

The invention has been explained with reference to exemplary embodiments, but is not intended to be limited to these exemplary embodiments. Rather, numerous modifications are conceivable for those skilled in the art without departing from the teaching of the invention. The scope of protection is therefore defined by the patent claims set forth hereinafter.

The invention claimed is:

1. A device for producing an extrudate from at least two starting products, at least one of which is a hot-melting starting product, comprising
    an extrusion container for receiving the starting products, having an extrusion opening,
    a heater configured to heat the starting products present in the extrusion container,
    an extruder configured to extrude the starting products, present in the extrusion container, from the extrusion container, and
    a centrifuge for dual asymmetric centrifugation of the extrusion container about a primary rotation axis and a secondary rotation axis, the primary rotation axis extending outside the extrusion container, and the secondary rotation axis extending through the extrusion container and being situated at an acute angle with respect to the primary rotation axis to intermix the starting products, wherein the device is configured to extrude the intermixed starting products, present in the extrusion container, from the extrusion container by single-axis centrifugation about the primary rotation axis, with the extrusion opening open.

2. The device according to claim 1, comprising a lock for opening and closing the extrusion opening of the extrusion container.

3. The device according to claim 1, wherein the extruder comprises a piston, movably situated in the extrusion container, for ejecting the intermixed starting products, present in the extrusion container, through the extrusion opening.

4. The device according to claim 3, wherein the piston is provided with a vent opening.

5. The device according to claim 3, comprising a driver for moving the piston relative to the extrusion container.

6. The device according to claim 1, wherein the device is configured to be changeable between a first and a second operating mode, in the first operating mode the extrusion container rotating about both rotation axes, and in the second operating mode the extrusion container rotating about only one of the two rotation axes.

7. The device according to claim 1, comprising a first driver for rotatably driving the extrusion container about the primary rotation axis, and a second driver, which may be coupled to and decoupled from the first driver, for rotatably driving the extrusion container about the secondary rotation axis.

8. The device according to claim 1, wherein the extrusion opening opens out from the extrusion container essentially radially relative to the primary rotation axis.

9. The device according to claim 1, comprising a collector configured to collect extrudate exiting from the extrusion container.

10. The device according to claim 3, wherein the piston is a screw piston advanceable by rotation in the extrusion container.

11. The device according to claim 4, wherein the vent opening is openable and closable.

12. The device according to claim 4, comprising a driver for moving the piston relative to the extrusion container.

13. A device for producing an extrudate from at least two starting products, at least one of which is a hot-melting starting product, comprising
 an extrusion container for receiving the starting products, having an extrusion opening,
 a heater configured to heat the starting products present in the extrusion container,
 an extruder configured to extrude the starting products, present in the extrusion container, from the extrusion container, and
 a centrifuge for dual asymmetric centrifugation of the extrusion container about a primary rotation axis and a secondary rotation axis, the primary rotation axis extending outside the extrusion container, and the secondary rotation axis extending through the extrusion container and being situated at an acute angle with respect to the primary rotation axis to intermix the starting products,
wherein the device is configured to extrude the intermixed starting products, present in the extrusion container, from the extrusion container by single-axis centrifugation about the primary rotation axis, with the extrusion opening open, and
wherein the extrusion opening is located at the bottom of the extrusion container.

\* \* \* \* \*